(12) United States Patent
Poslinski et al.

(10) Patent No.: US 6,364,152 B1
(45) Date of Patent: Apr. 2, 2002

(54) FOOD STORAGE CONTAINER

(75) Inventors: Edward M. Poslinski, Orlando; Brent E. D'Alessio, Palm Bay, both of FL (US)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 09/547,618

(22) Filed: Apr. 12, 2000

(51) Int. Cl.⁷ .................. B65D 53/00; B65D 41/16
(52) U.S. Cl. .................. 220/788; 220/795; 220/378; 220/240; 215/270
(58) Field of Search .................. 220/780, 795, 220/793, 788, 786, 784, 239, 240, 305, 212; 215/262, 270, 228

(56) References Cited

U.S. PATENT DOCUMENTS

| 2,212,804 A | * | 8/1940 | Wynings |
| 3,339,605 A | | 9/1967 | Ignell |
| 3,414,160 A | * | 12/1968 | Weber |
| 3,679,088 A | | 7/1972 | Swett et al. |
| 3,854,617 A | | 12/1974 | Edwards |
| 4,051,971 A | * | 10/1977 | Saleri et al. ............. 215/262 |
| 4,149,650 A | * | 4/1979 | Whelchel et al. |
| 4,223,800 A | | 9/1980 | Fishman |
| 4,342,419 A | | 8/1982 | Conway |
| 4,420,076 A | | 12/1983 | Beveridge et al. |
| 5,025,948 A | * | 6/1991 | Fixon |
| 5,121,590 A | * | 6/1992 | Scanlan |
| 5,348,549 A | * | 9/1994 | Brown et al. ............. 220/788 |
| 5,974,686 A | * | 11/1999 | Nomura et al. |
| 5,979,691 A | * | 11/1999 | Von Holdt ............. 220/786 |
| 5,992,666 A | * | 11/1999 | Wu ............. 215/228 |

FOREIGN PATENT DOCUMENTS

| JP | 10-24966 | * | 1/1998 |
| WO | WO-97/06075 | * | 2/1997 |

* cited by examiner

*Primary Examiner*—Nathan J. Newhouse
(74) *Attorney, Agent, or Firm*—Taylor J. Ross

(57) ABSTRACT

A food storage container 10 includes a base 12 and lid 14. The base 12 has a sealing flange 22, and the lid 14 has a sealing lip 32 which seals against the sealing flange 22 as with a suction cup. The lid 14 may include resilient deformable sections 46, 50, to aid in maintaining reduced pressure within the container. The lid 14 may include latch prongs 54 to mechanically retain the lid 14 in position. The latch prongs 54 may be designed to automatically release during heating of the food, permitting venting. The sealing lip 32 may include seal spacers 60 which permit air to enter the food storage container 10 during serving of hot food to avoid creation of reduced pressure in the container. The seal spacers 60 do not interfere with normal creation of a seal when desired.

7 Claims, 2 Drawing Sheets

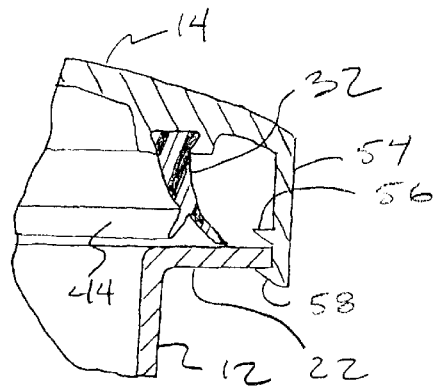
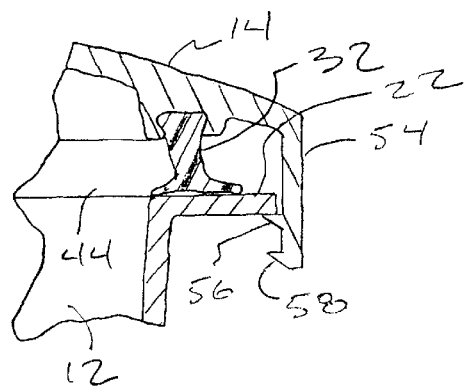
FIG. 4
FIG. 5
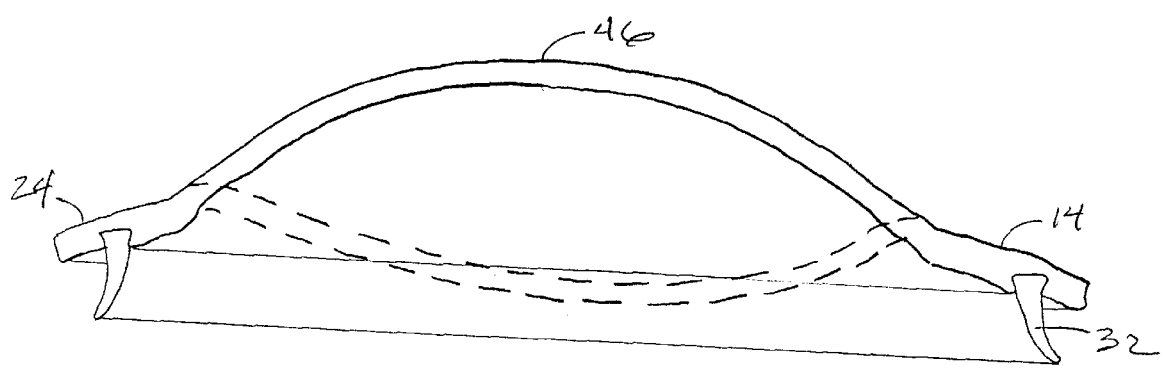
FIG. 6
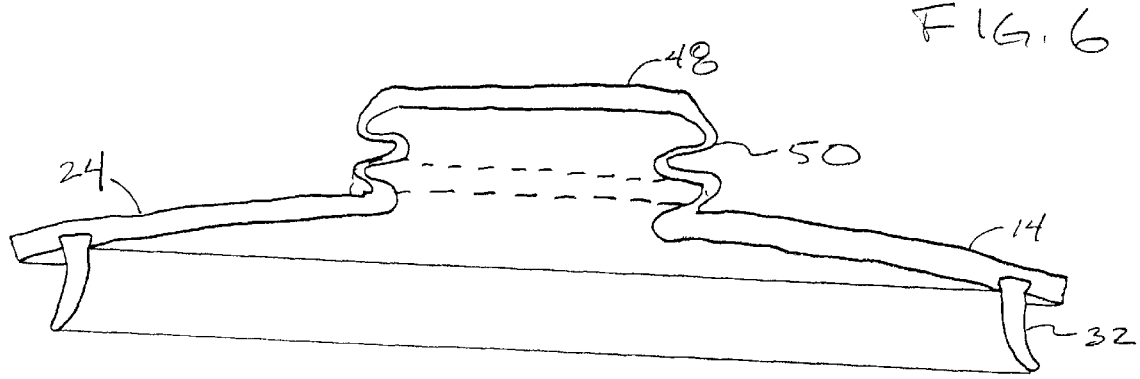
FIG. 7

FOOD STORAGE CONTAINER

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to food storage containers for household use. In particular, the present invention relates to an improved food storage container having a lid which is secured to the base by vacuum, and which includes features for use in freezing temperatures and cooking temperatures.

Household food storage containers are widely known. These are typically formed of a resilient plastic, and include a base which holds a quantity of food, and a lid which closes the base. The degree of seal provided between the base and lid is important, as a stronger seal prevents contamination and increases storage life. A good seal, together with a resilient lid or base, will also permit a quantity of air to be expelled from the container during sealing, thus creating a reduced pressure within the container. This also serves to improve storage life for many types of food. The best seals have typically been provided by interlocking rib and groove arrangements.

While a rib and groove provide a good seal, they are often difficult to open and close. To overcome this problem, some containers have attempted to retain the lid simply by the reduced pressure within the container. Specifically, in one known container, the base is formed with an upper rim. The lid is formed of a slightly resilient material, and includes a gasket of highly elastic material, such as silicone. Placing the lid on the base brings the gasket into contact with the rim of the base, providing a seal. A one-way valve in the lid permits air to escape when manual pressure is applied to deform the lid inward. This creates a reduced pressure in the container, which serves to retain the lid in position.

While this container is fine in theory, in practice the seal is not sufficient to maintain the reduced pressure. As such, over a relatively short period of time the reduced pressure is gone, and the lid is simply resting upon the base without any true seal. This is especially true when the container is subjected to freezing temperatures. This lack of a seal reduces storage life for the food.

SUMMARY OF THE INVENTION

An object of the present invention is to provide a food storage container having a strong seal, and maintaining reduced pressure.

Another object of the present invention is to retain the lid upon the container with this reduced pressure to the extent possible.

Yet another object of the invention is to mechanically retain the lid in position during freezing temperatures.

A further object of the invention is to provide a seal which does not operate during serving, to ease removal of the lid.

These and other objects are achieved by a food storage container having a base and lid. The base has a sealing flange, and the lid has a sealing lip which seals against the sealing flange as with a suction cup. The lid may include resilient deformable sections to aid in maintaining reduced pressure within the container. The lid may include latch prongs to mechanically retain the lid in position. The latch prongs may be designed to automatically release during heating of the food, permitting venting. The sealing lip may include seal spacers which permit air to enter the food storage container during serving of hot food to avoid creation of reduced pressure in the container. The seal spacers do not interfere with normal creation of a seal when desired.

BRIEF DESCRIPTION OF THE DRAWINGS

The objects and features of the invention noted above are explained in more detail with reference to the drawings, in which like reference numerals denote like elements, and in which:

FIGS. 4 and 5 are detail cross-sectional views similar to FIGS. 2 and 3, showing an alternative embodiment; and FIGS. 6 and 7 are detail cross-sectional views of alternative lid embodiments;

DETAILED DESCRIPTION OF THE INVENTION

Figure 1:
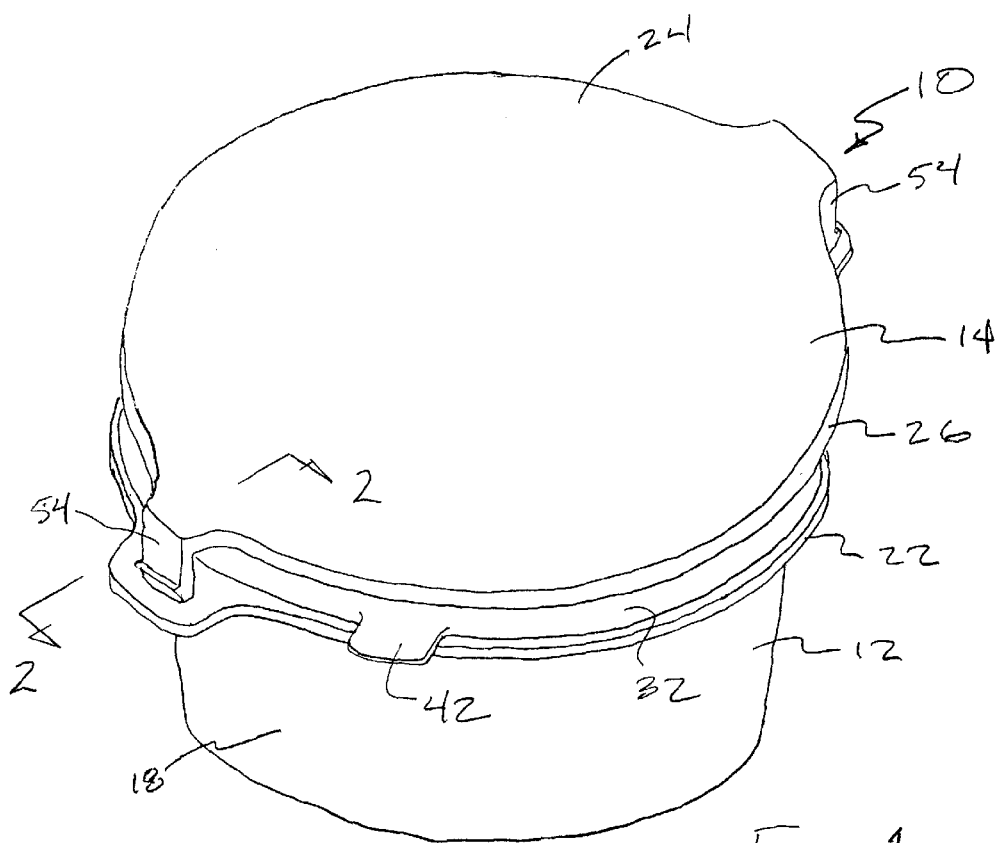
FIG. 1 is a perspective view of a container according to one embodiment of the present invention.

With reference to FIG. 1, a food storage container according to the present invention is generally designated by reference numeral 10. The food storage container 10 generally includes a base 12 and a lid 14. These two elements act together, as described more fully below, to selectively provide a sealed, reduced pressure storage volume for food.

The base 12 includes a bottom wall 16 having a periphery. This periphery may be circular, as shown, or a variety of other shapes such a oval, square, etc. Extending upward from this periphery are one or more side walls 18. While the side walls 18 are preferably a monolithic extension of the bottom wall 16 (as shown), they may be formed as separate elements secured together. The side walls 18 extend to an upper rim 20. This upper rim will typically have a peripheral shape corresponding to that of the bottom wall 16, although they could be different, such as a circular bottom wall 16 and an oval upper rim 20. Extending outward from this upper rim 20 is a sealing flange 22. The sealing flange 22 is wider than is typically employed in food storage containers, for reasons made apparent below.

The lid 14 is intended to be placed upon the base 12 in covering relation, and to be removed when desired. The lid 14 includes a main body 24 having a peripheral edge 26. When the lid 14 is in the cover position shown, the peripheral edge 26 will extend over the upper rim 20 at all locations. The main body 24 has an inner face 28 and an exteriorface 30. The lid 14 also includes a sealing lip 32 extending therefrom in a direction towards the sealing flange 22, when in the covering position.

The sealing lip 32 extends about the entire periphery of the main body 24, defining a closed geometric form which typically corresponds closely to the form of the peripheral edge 26. The sealing lip 32 may be mounted to the main body 24 at the peripheral edge 26, but for aesthetic reasons it is preferred to be mounted to the inner face 28 of the main body 24. This mounting may be by various means, such as bonding, but is preferably a press fit of an enlarged head 34 at the upper end of the sealing lip 32 within a mating groove 36 formed upon the inner face 28 of the main body 24. The sealing lip 32 tapers to a reduced thickness, and curves outward to a free end 38, in a manner similar to known suction cup devices. Similarly, the sealing lip 32 is formed of a highly elastic and relatively flexible material, such a rubber, silicone, and the like.

Figure 2:
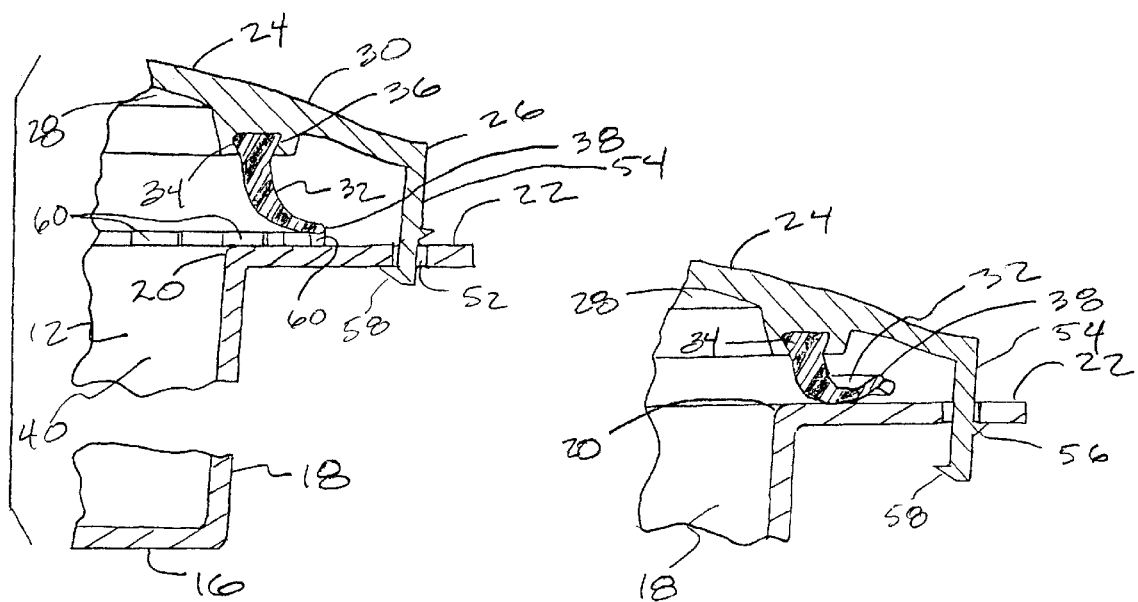
FIG. 2 is a detail cross-sectional view along line 2—2 of FIG. 1 with the lid in the rest position.
Figure 3:
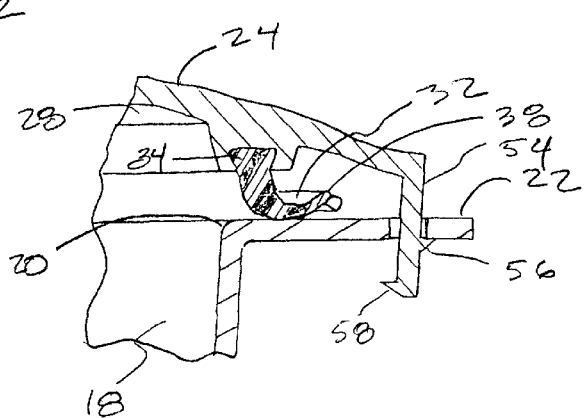
FIG. 3 is a view as in FIG. 2, with the lid in the closed and sealed position.

As shown in FIG. 2, when the lid 14 is placed upon the base 12 in the rest position, the free end 38 will rest upon the sealing flange 22. As such, the base 12 and lid 14 serve to define an interior volume 40. Manual pressure upon the lid 14 will cause the sealing lip 32 to deform, and will reduce the extent of this volume 40. A portion of the air within volume 40 will be expelled during this process. Upon release of the manual pressure the elastic nature of the sealing lip 32 will tend to move the main body 24 away from the base 12. The seal of the sealing lip 32 against sealing flange 22, however, will prevent ingress of air (at least to a very large extent). The movement of the main body 24 will therefore be impeded by a growing reduced pressure within volume 40. If properly designed, this reduced pressure will serve to retain the lid 14 upon base 12 in a rather strong manner. This is referred to as the closed and sealed position of the lid 14, and is shown in FIG. 3. As such, the food storage container 10 may be covered with the lid 14, this lid may be strongly secured to the base 12, and the volume 40 storing the food may be placed at a reduced pressure.

To release the lid 14, it is typically necessary to eliminate the reduced pressure within the volume 40. This may be achieved by deforming the sealing lip 32 sufficiently to permit air to enter the volume 40. To this end, a release tab 42 preferably extends from at least one location on the free end 38 of sealing lip 32. This release tab 42 operates in a manner similar to release tabs formed on prior art suction cup devices.

The arrangement described above is all that is required to provide a sealed food storage container. Variations to this basic arrangement are of course possible. For example, as shown in FIGS. 4 and 5, the sealing lip 32 may include an inner leg 44 curving inward, such that in the closed and sealed position of FIG. 5, both the free end 38 and inner leg 44 seal against the sealing flange 22. Other variations are also of course possible. These basic arrangements will, again, provide sealed storage. Further, this storage may be at refrigerated temperatures while still maintaining the desired seal, provided the sealing lip 32 is designed by those knowledgeable in the art. It is desired, however, to provide for use of the food storage container 10 in more extreme temperature environments, such as frozen storage, reheating, and possibly even cooking.

One known problem with containers having lid retention due to reduced internal pressure is the loss of the reduced pressure with low temperatures. Specifically, the container is filled, or partially filled, with food prior to storage. The lid is applied, creating a volume of reduced pressure air above the food which serves to retain the lid. During freezing, the water within the food expands, such that the volume of the food increases. Within the sealed container, this serves to compress the air, raising its pressure. For most foods, this increase in pressure has typically been so great as to eliminate the reduced pressure, and thus eliminate the seal. Without a seal, the food is not safe from freezer burn and contamination, and the lid is not secured to the base.

The food storage container 10 of the present invention is believed to overcome this problem by two different methods. The first is to maintain a reduced pressure within the container by evacuating a larger quantity of air during sealing.

A first example of this is shown in FIG. 6, where the main body 24 of lid 14 is modified to include a deformable dome 46. This dome may be formed monolithically with the remainder of the main body 24, or could be a separate element formed of material more elastic than the remainder. In either case, the dome is deformable by manual pressure during the process of applying the lid 14 to the base 12. The undeformed state is shown in solid line, and the deformed state is shown in dashed line. As may be appreciated, the deformation will serve to force a much larger quantity of air from the volume 40. It is important to note that this deformation is not of the bistable variety. It is critical to operation that the dome 46 resiliently seek to return to its original, undeformed state. As such, the expansion of the food may compress the air within volume 40, but the dome 46 will deform towards its original shape with this compression, and will cause a continued state of reduced pressure within the volume 40 (assuming a sufficiently large volume of air is displaced by the initial deformation of the dome).

A similar arrangement is shown in FIG. 7. Here, a portion 48 of the sealing lip 32 is offset from the remainder by a resilient, collapsible conduit 50. Again, manual pressure will collapse the conduit 50, expelling air. The resilient nature of the conduit 50 will seek to force the portion 48 upward to its original position, absorbing the compression of air caused by food expansion. Other arrangements are also possible, such as using a valve (not shown) in the main body 24 together with a pump to evacuate such a large quantity of air that reduced pressure will be maintained even upon food expansion.

While this arrangement is feasible, the domes and conduits described add to the size of the container, or at least the lid 14, making it more difficult to store the food storage container 10 prior to use for food storage. A separate pump adds more cost to the system, and requires additional steps in the food storage process. As such, maintaining the seal during freezing is preferred to be achieved using a different arrangement forming a mechanical lock.

A first embodiment of this shown in FIGS. 1–3. As may be seen, the sealing flange 22 includes at least two peripherally spaced apertures 52 extending therethrough. The main body 24 also includes a like number of latch prongs 54 extending downward at peripherally spaced locations aligned with the apertures 52, such that the latch prongs 54 will be received through the apertures 52 when the lid is in the rest position.

Each of the latch prongs 54 includes a first latch shoulder 56 located at a position such that the first latch shoulder 56 will abut against the lower face of the sealing flange 22 when the lid 14 is in the closed and sealed position of FIG. 3 (i.e., the lid is sealed and the volume 40 is at reduced pressure). As may be seen, this will mechanically retain the lid in the closed and sealed position even if the reduced pressure within volume 40 is completely lost. The sealing lip 32 will still be tightly pressed against the sealing flange 22, reducing the possibility of freezer burn and contamination. The user may also lift the entire food storage container 10 by the lid 14 without fear of the base 12 falling therefrom. When it is desired to remove the lid 14, the latch prongs 54 may be manually deformed to release the first latch shoulder 56 and permit the entire lid 14 to move upward: In this regard, it is noted that the first latch shoulder 56 may be formed on the exterior face of the latch prongs 54, as shown, or may be formed on the interior face (not shown).

It is noted that the latch prongs 54 must not interfere with the deformation of the sealing lip 32, which may deform outward during sealing. This may be achieved by forming the entire periphery of the main body 24 as a larger size (not shown). Alternatively, only portions of the periphery corresponding to the latch prongs 54 could be enlarged outward. This is also the case with the sealing flange 22, and the apertures 52 could be formed in enlarged portions of the sealing flange 22, as shown.

A useful variation on this arrangement is to provide each of the latch prongs 54 with a second latch shoulder 58. While similar to the first latch shoulder 56, the second latch shoulder 58 is positioned to engage against the lower face of the sealing flange 22 when the lid is in the rest position (i.e., the lid rests upon the base, but is not sealed and the volume 40 is not at reduced pressure) as shown in FIG. 2. This will provide additional security against spilling, and will again allow the user to lift the food storage container 10 by the lid 14 without fear of the base 12 falling therefrom. This second latch shoulder 58 is also released by manual deformation of the latch prongs 54. As with the first latch shoulder 56, the second latch shoulder 58 may be formed on either the inner or outer face of the latch prongs 54.

Yet another possible variation is to eliminate the apertures 52. This is shown in FIGS. 4 and 5, where the first latch shoulder 56 and second latch shoulder 58 are both formed on the inner face of the latch prongs 54, and engage with the outer peripheral edge of the sealing flange 22. This variation may be simpler to manufacture, and does not require the user to align the lid 14 in any particular angular orientation.

The above variations may be seen to permit the food storage container 10 to be used in freezing temperatures. As noted, it is also desired to use the food storage container 10 in elevated temperatures such as for reheating or actual cooking. This is desired to encompass heating in all types of ovens, conventional, microwave, halogen, etc.

During reheating and cooking, a portion of the water within the food will be turned to steam. This will be added to the air within the volume 40, increasing the pressure within volume 40. It is desirable to vent this steam to avoid creating high pressures within the food storage container 10. The seal provided in the closed and sealed position of FIG. 3 will typically be too tight for adequate venting. As such, it is desired to conduct all reheating and cooking with the lid in the rest position of FIG. 2. While the mechanical latch arrangement described above may appear to secure the lid in the closed and sealed position, it may in fact be designed to automatically move to the rest position during reheating and cooking.

Specifically, with heating the pressure within the food storage container 10 will rise. If the food storage container 10 is formed of the proper materials, and with the proper configuration, the deformation of the container will automatically release the first latch shoulder 56. This is best illustrated in FIG. 3. With this embodiment, forming the main body 24 of a partially resilient material, such a polypropylene, will permit deformation due to the internal pressure. Further, the shallow dome configuration shown will tend to bow outward more dramatically during deformation due to internal pressure. With the latch prongs 54 secured to the edge of the main body 24, this bowing will tend to move the free end of the latch prongs 54 inward. As such, forming the first latch shoulders 56 on the outer face of the latch prongs 54 will permit them to move out of abutment with the sealing flange 22 during this deformation. As such, the user may place a closed and sealed container, as shown in FIG. 3, within an oven without worry. During heating, the lid 14 will automatically release from the closed and sealed position and move to the rest position of FIG. 2. At that point the pressure within the volume 40 may deform the sealing lip 32 to release the internal pressure. As such, the lid 14 will permit the necessary venting, but will remain in place to reduce splattering within the oven, all automatically.

A further feature of the present invention provides advantages after heating. Specifically, after reheating or cooking, the food storage container 10 may be placed in a room temperature environment prior to, and during, serving. To retain heat, the lid 14 will typically be retained in the rest position. As the food and air within the volume 40 cools, it contracts. The moisture present on the sealing lip 32 and sealing flange 22 increases the sealing ability of the lid 14, and these factors combine to create a slight reduced pressure seal of the lid 14 on the base. This is typically not so great as the full closed and sealed position, but it may make removal of the lid difficult or impossible without use of the release tab 42.

To avoid this, the sealing lip 32 may be provided with a plurality of seal spacers 60, as shown in FIG. 2. As shown, the seal spacers 60 take the form of a plurality of peripherally spaced protrusions extending downward from a position in proximity to the free end 38 of sealing lip 32. These seal spacers 60 will create a plurality of gaps or spaces therebetween when the lid is in the rest position. To this end, it is critical that the sealing lip 32 be sufficiently rigid to be supported by the seal spacers 60 alone in the rest position. The positioning of the seal spacers 60 adjacent the free end 38, however, permits a large portion of the sealing lip 32 to still contact the sealing flange 22 when deformed by movement of the lid 14 to the sealed and closed position. This is illustrated in FIG. 3. As may be envisioned, with the lid 14 in the rest position the seal spacers 60 will permit air to flow into the volume 40 during cooling, eliminating any reduced pressure within volume 40, and thus permitting the lid to be easily removed during serving. The seal spacers 60 do not, however, interfere with the ability to form a seal when such is desired. This feature, in combination with the automatically releasing latch prongs 54, provides a container which may be used to freeze, reheat and serve food in a very efficient and easy to use manner.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A food storage container having a base with a bottom wall and at least one side wall extending to a rim, and a lid to mount to said base in covering relation, said base having a sealing flange extending outward from said rim, and said lid including a main body and a resilient sealing lip extending therefrom, said sealing lip defining a closed geometric form and positioned to seal against said sealing flange, said base and lid being constructed and arranged such that manual pressure upon said lid deforms said sealing lip against said sealing rim from a rest position to a closed position, and the resilient force of said sealing lip creates reduced pressure within said container to thus retain said lid upon said base in said closed position, the improvement comprising:

said sealing lip including at least one seal spacer extending therefrom in a position to cause a gap between said sealing lip and said sealing flange when said lid is in said rest position, yet permitting a seal between said sealing lip and said sealing flange when said lid is in said closed position.

2. A food storage container as in claim 1, wherein said main body further includes at least two peripherally space latch prongs extending downward therefrom, each of said latch prongs including a first latch shoulder positioned to engage said base when said lid is in said closed position.

3. A food storage container as in claim 2, wherein each of said latch prongs further includes a second latch shoulder positioned to engage said base when said lid is in said rest position.

4. A food storage container as in claim 3, wherein said first latch shoulder and said second latch shoulder are located at diametrically opposed positions on said latch prong.

5. A food storage container having a base with a bottom wall and at least one side wall extending to a rim, and a lid to mount to said base in covering relation, said base having a sealing flange extending outward from said rim, and said lid including a main body and a resilient sealing lip extending therefrom, said sealing lip defining a closed geometric form and positioned to seal against said sealing flange, said base and lid being constructed and arranged such that manual pressure upon said lid deforms said sealing lip against said sealing rim from a rest position to a closed position, and the resilient force of said sealing lip creates reduced pressure within said container to thus retain said lid upon said base in said closed position, the improvement comprising:

said main body further includes at least two peripherally space latch prongs extending downward therefrom, each of said latch prongs including a first latch shoulder positioned to engage said base when said lid is in said closed position.

6. A food storage container as in claim 5, wherein each of said latch prongs further includes a second latch shoulder positioned to engage said base when said lid is in said rest position.

7. A food storage container as in claim 6, wherein said first latch shoulder and said second latch shoulder are located at diametrically opposed positions on said latch prong.

* * * * *